United States Patent
Waineo et al.

(10) Patent No.: US 10,935,122 B2
(45) Date of Patent: Mar. 2, 2021

(54) BEARING PRELOAD APPARATUS

(71) Applicant: AMERICAN AXLE & MANUFACTURING, INC., Detroit, MI (US)

(72) Inventors: Bryan N. Waineo, Northville, MI (US); James P. Downs, South Lyon, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 221 days.

(21) Appl. No.: 16/272,293

(22) Filed: Feb. 11, 2019

(65) Prior Publication Data
US 2020/0256450 A1    Aug. 13, 2020

(51) Int. Cl.
| | | |
|---|---|---|
| F16C 43/00 | (2006.01) |
| F16H 57/021 | (2012.01) |
| F16D 21/06 | (2006.01) |
| B23P 19/00 | (2006.01) |
| B23P 19/04 | (2006.01) |

(52) U.S. Cl.
CPC ............ *F16H 57/021* (2013.01); *B23P 19/00* (2013.01); *F16C 43/00* (2013.01); *F16D 21/06* (2013.01); *B23P 19/04* (2013.01); *F16C 2229/00* (2013.01); *F16C 2361/61* (2013.01); *F16D 2300/18* (2013.01); *Y10T 29/53104* (2015.01)

(58) Field of Classification Search
CPC ...... F16C 19/547; F16C 19/383; F16C 31/04; F16C 32/0674; F16C 33/00; F16C 35/06; F16C 2229/00; F16C 43/00; F16C 2361/61; Y10T 29/53104; F16D 21/06; F16D 2300/18; B23P 19/04; B23P 19/00
See application file for complete search history.

(56) References Cited

U.S. PATENT DOCUMENTS

| | | | |
|---|---|---|---|
| 5,125,156 A | | 6/1992 | Witte |
| 5,579,570 A | * | 12/1996 | Bonvallet ............. B23P 19/066 29/724 |
| 6,000,134 A | | 12/1999 | Jerraid |
| 6,088,910 A | | 7/2000 | Jerraid |
| 6,907,773 B2 | | 6/2005 | Passino et al. |
| 8,342,039 B2 | | 1/2013 | Wickens |
| 9,091,298 B2 | | 7/2015 | Szpara et al. |

FOREIGN PATENT DOCUMENTS

| | | |
|---|---|---|
| CN | 102528437 B | 8/2014 |
| CN | 105058035 B | 5/2017 |

* cited by examiner

*Primary Examiner* — Jason L Vaughan
*Assistant Examiner* — Amanda Kreiling
(74) *Attorney, Agent, or Firm* — Burris Law, PLLC

(57) ABSTRACT

A bearing preload apparatus may include a gearbox assembly, a coupling assembly, and a sensor assembly. The gearbox assembly may include a gearbox housing, a first shaft and a second shaft. The first and second shafts may extend out of the housing and may be rotatable simultaneously with each other at different speeds. The coupling assembly may include a first driver coupling connected to the first shaft and a second driver coupling connected to the second shaft. The sensor assembly may be mounted to a stationary structure and the gearbox housing. The sensor assembly may measure a reaction torque of the gearbox assembly relative to the stationary structure.

21 Claims, 6 Drawing Sheets

BEARING PRELOAD APPARATUS

FIELD

The present disclosure relates to an apparatus for preloading a bearing.

BACKGROUND

This section provides background information related to the present disclosure and is not necessarily prior art.

Some bearings, such as tapered roller bearings for rotationally and axially supporting an input pinion in an automotive axle assembly, need to be preloaded. Typically, a nut is threaded to a hub or shaft that is supported by the tapered roller bearing to generate an axially directed clamping force that preloads the tapered roller bearing. A bearing preload device can be used to tighten the nut on the shaft or hub to provide a desired preload. Conventionally, such bearing preload devices determine the bearing preload by measuring the bearing housing reaction torque that results from rotation of the tapered roller bearings while the nut is being tightened or after the nut has been tightened. The present disclosure provides a bearing preload apparatus that accurately measures bearing preload independent of the bearing housing while using less power and occupying less space than conventional bearing preload devices.

SUMMARY

This section provides a general summary of the disclosure, and is not a comprehensive disclosure of its full scope or all of its features.

The present disclosure provides a bearing preload apparatus that may include a gearbox assembly, a coupling assembly, and a sensor assembly. The gearbox assembly may include a gearbox housing, a first shaft and a second shaft. The first and second shafts may extend out of the housing and may be rotatable simultaneously with each other at different speeds. The coupling assembly may include a first driver coupling connected to the first shaft and a second driver coupling connected to the second shaft. The sensor assembly may be mounted to a stationary structure and the gearbox housing. The sensor assembly may measure a reaction torque of the gearbox assembly relative to the stationary structure.

In some configurations of the bearing preload apparatus of the above paragraph, the sensor assembly includes a plurality of sensors disposed between the gearbox housing and a plate attached to the stationary structure.

In some configurations of the bearing preload apparatus of the above paragraphs, the sensors are piezoelectric force transducers.

In some configurations of the bearing preload apparatus of any of the above paragraphs, the sensors are arranged in a circular pattern that extends around the first and second shafts.

In some configurations of the bearing preload apparatus of any of the above paragraphs, the first and second shafts have a common rotational axis.

In some configurations of the bearing preload apparatus of any of the above paragraphs, the first shaft extends through a central aperture of the second shaft.

In some configurations of the bearing preload apparatus of any of the above paragraphs, the first shaft includes a first gear, and the second shaft includes a second gear that is axially adjacent the first gear.

In some configurations of the bearing preload apparatus of any of the above paragraphs, the gearbox assembly includes a pinion gear, a ring gear, and a plurality of planet gears.

In some configurations, the bearing preload apparatus of any of the above paragraphs further comprises a first motor and a second motor.

In some configurations of the bearing preload apparatus of any of the above paragraphs, the first motor is drivingly connected to an end of the first shaft.

In some configurations of the bearing preload apparatus of any of the above paragraphs, the second motor is drivingly connected to a shaft extending from the pinion gear.

In some configurations of the bearing preload apparatus of any of the above paragraphs, the pinion gear is meshingly engaged with the ring gear, and rotation of the ring gear causes the planet gears to orbit around the first and second shafts.

In some configurations of the bearing preload apparatus of any of the above paragraphs, each planet gear is meshingly engaged with the first and second gears.

In some configurations of the bearing preload apparatus of any of the above paragraphs, the second gear has more teeth than the first gear, and the first and second gears have equal outer diameters.

The present disclose also provides a bearing preload apparatus that may include a first motor, a second motor, and a gearbox assembly. The first motor has a first output shaft. The second motor has a second output shaft. In some configurations, the second output shaft is parallel to the first output shaft. The gearbox assembly may be driven by the first and second motors. The gearbox assembly may include a gearbox housing, a plurality of planet gears, an inner shaft, and an outer shaft that extends around the inner shaft. The inner and outer shafts may extend out of the gearbox housing and may be rotatable simultaneously with each other at different speeds. The inner shaft may include a first gear. The outer shaft may include a second gear that is axially adjacent the first gear. Each of the planet gears may be meshingly engaged with the first and second gears. The first output shaft of the first motor may drive the inner shaft. The second output shaft of the second motor may drive orbital motion of the planet gears around the inner and outer shafts.

In some configurations, the bearing preload apparatus of the above paragraph further comprises a coupling assembly including a first driver coupling connected to the inner shaft and a second driver coupling connected to the outer shaft.

In some configurations, the bearing preload apparatus of either of the above paragraphs further comprises a sensor assembly mounted to a stationary structure and the gearbox housing, the sensor assembly measuring a reaction torque of the gearbox assembly relative to a stationary structure to which the gearbox assembly is mounted.

In some configurations of the bearing preload apparatus of any of the above paragraphs, the sensor assembly includes a plurality of sensors disposed between the gearbox housing and a plate attached to the stationary structure.

In some configurations of the bearing preload apparatus of any of the above paragraphs, the sensors are arranged in a circular pattern that extends around the inner and outer shafts.

In some configurations of the bearing preload apparatus of any of the above paragraphs, the sensors are piezoelectric force transducers.

In some configurations of the bearing preload apparatus of any of the above paragraphs, the gearbox assembly includes a pinion gear and a ring gear.

In some configurations of the bearing preload apparatus of any of the above paragraphs, the second output shaft of the second motor is drivingly connected to a shaft extending from the pinion gear.

In some configurations of the bearing preload apparatus of any of the above paragraphs, the pinion gear is meshingly engaged with the ring gear, and rotation of the ring gear causes the planet gears to orbit around the inner and outer shafts.

In some configurations of the bearing preload apparatus of any of the above paragraphs, the second gear has more teeth than the first gear, and the first and second gears have equal outer diameters.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
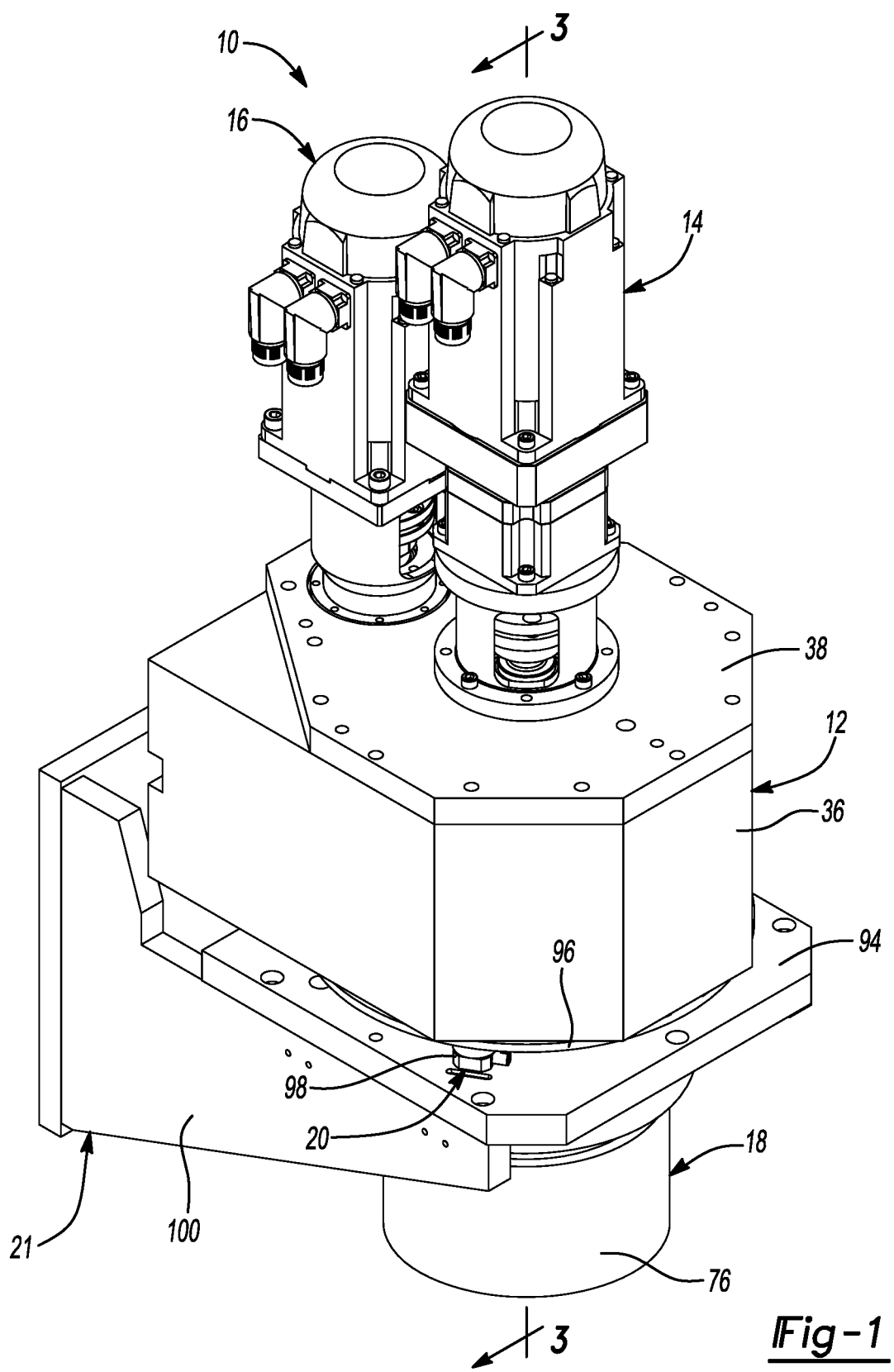
FIG. 1 is a perspective view of a bearing preload apparatus according to the principles of the present disclosure.

Example embodiments will now be described more fully with reference to the accompanying drawings.

With reference to FIGS. 1-5, a bearing preload apparatus 10 is provided. The apparatus 10 of the present disclosure can accurately preload a rolling element bearing (e.g., a tapered roller bearing) using less power and occupying less space than conventional bearing preload machines. The apparatus 10 may include a gearbox assembly 12, a first motor 14, a second motor 16, a coupling assembly 18, and a torque sensor assembly 20. The apparatus 10 may be mounted on a mounting bracket 21, which may be fixedly mounted to a frame, a wall, or another fixed structure.

Figure 2:
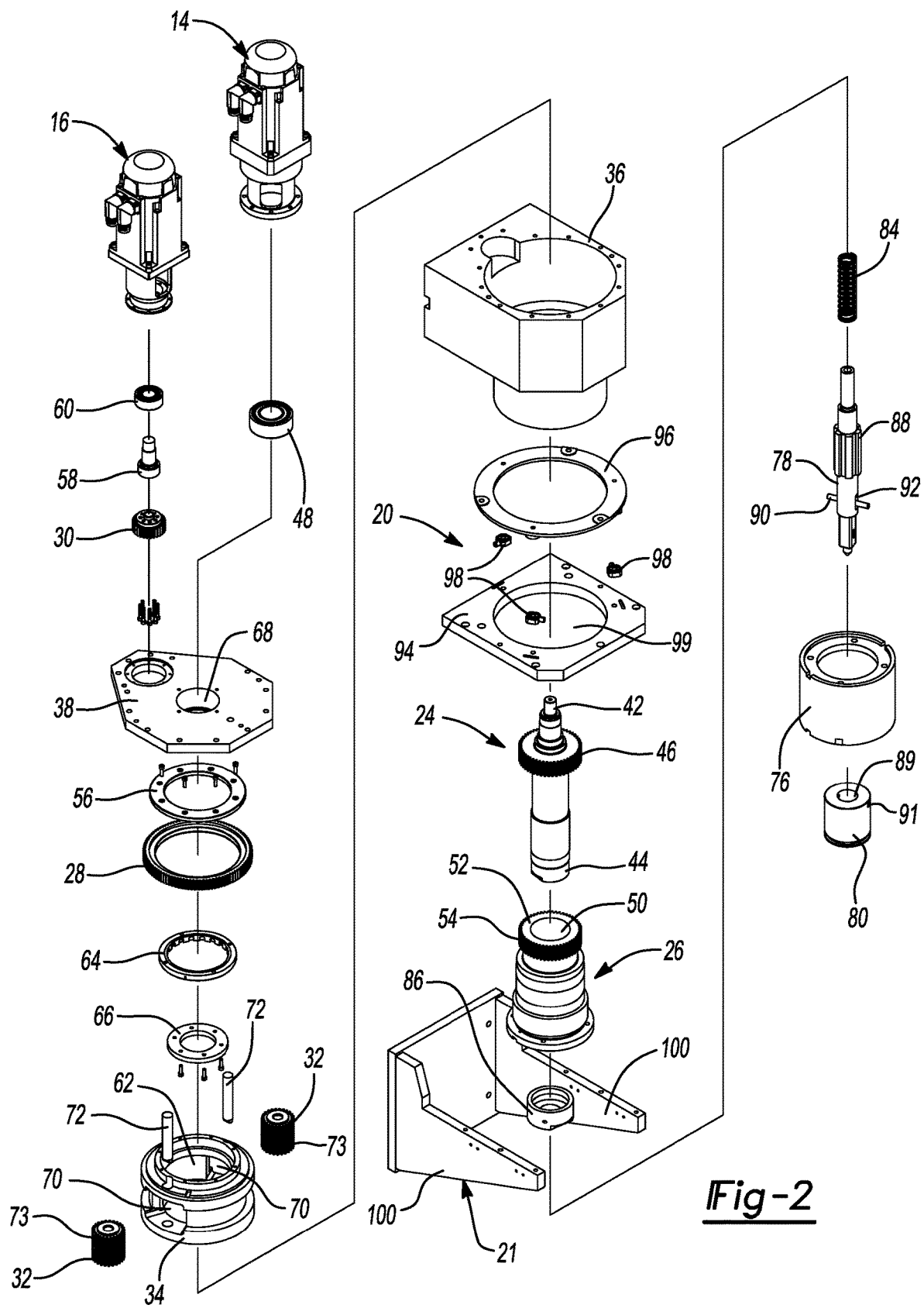
FIG. 2 is an exploded view of the bearing preload apparatus of FIG. 1.
Figure 3:
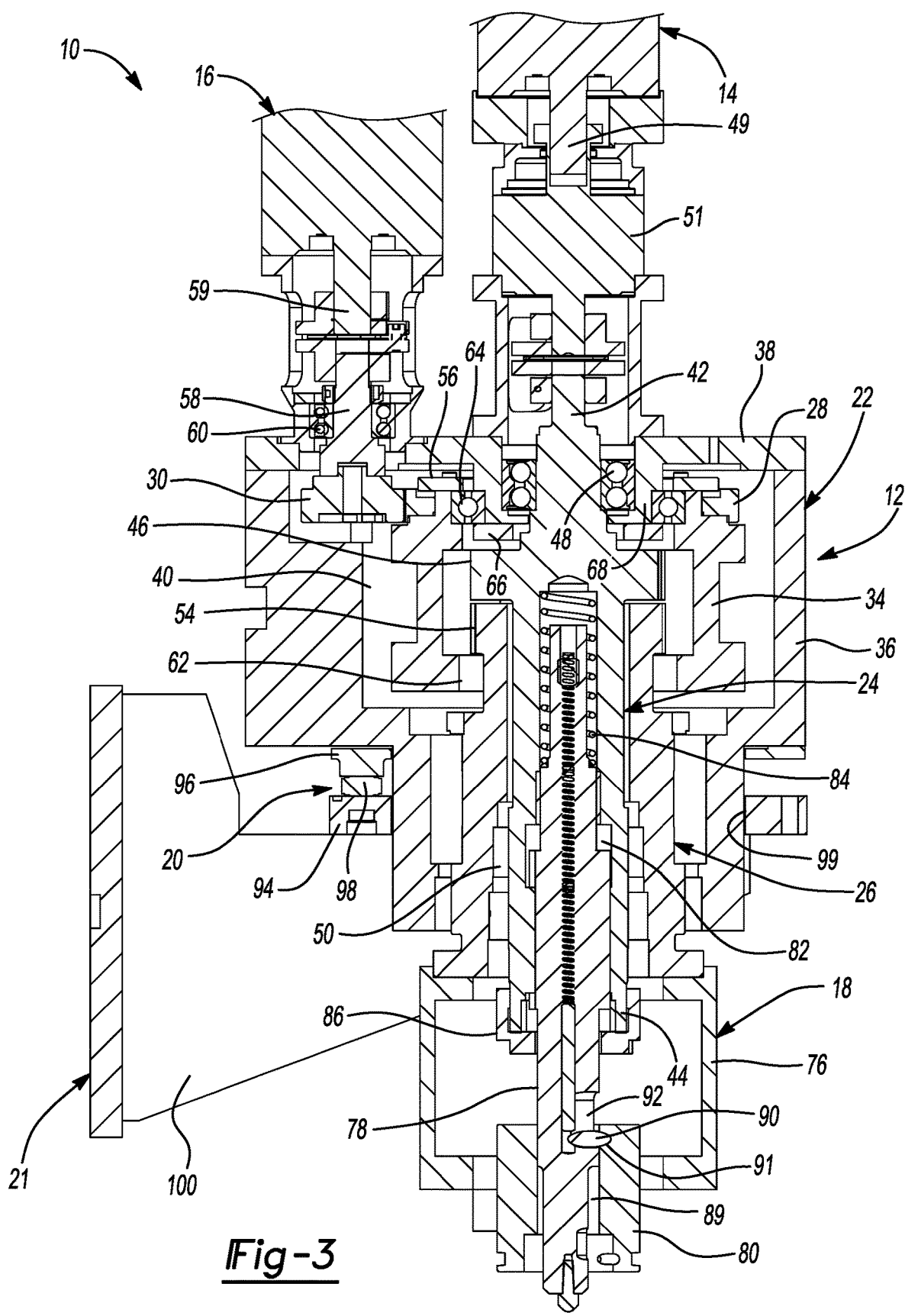
FIG. 3 is a cross-sectional view of the bearing preload apparatus taken at a plane defined by line 3-3 of FIG. 1.
Figure 4:
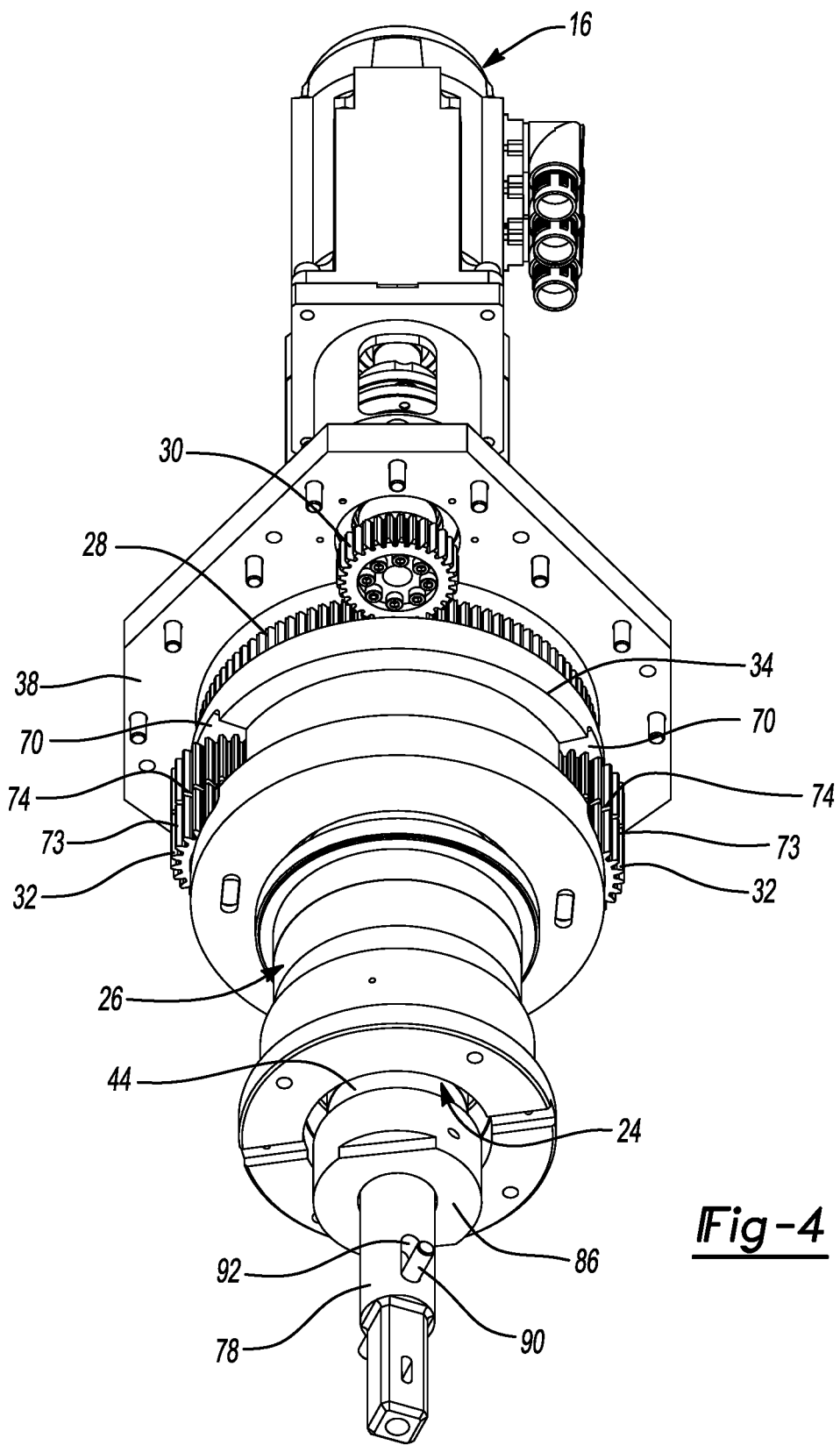
FIG. 4 is a partial perspective view of the bearing preload apparatus with a portion of a gearbox housing removed.

The gearbox assembly 12 may include a gearbox housing 22 (FIGS. 1-3) and a Ferguson paradox type planetary gear train including an inner shaft 24 (FIGS. 2 and 3), an outer shaft 26 (FIGS. 2 and 3), a ring gear 28 (FIGS. 2-5), a pinion gear 30 (FIGS. 2-5), a pair of planet gears 32 (FIGS. 2, 4, and 5), and a carrier 34 (FIGS. 2-4). The housing 22 may include a generally hollow main body 36 and a cap plate 38 that cooperate to define a cavity 40 (FIG. 3) in which the inner shaft 24, outer shaft 26, ring gear 28, pinion gear 30, planet gears 32, and carrier 34 are disposed.

As shown in FIGS. 2 and 3, the inner shaft 24 may include a first end 42, a second end 44, and an integrally formed nut gear 46 disposed between the first and second ends 42, 44. The inner shaft 24 may be rotatably supported at or near the first end 42 by a bearing 48 attached to the cap plate 38. As shown in FIG. 3, the first motor 14 may be mounted to the cap plate 38 and may include an output shaft 49 that is drivingly connected (directly or indirectly) to the first end 42 of the inner shaft 24 so that operation of the first motor 14 rotatably drives the inner shaft 24 relative to the housing 22. The output shaft 49 may be connected to the first end 42 of the inner shaft 24 by a gearbox or servo reducer 51 (shown schematically in FIG. 3).

As shown in FIGS. 2 and 3, the outer shaft 26 may be an annular member having a central aperture 50 through which the inner shaft 24 extends. A first end 52 of the outer shaft 26 may include an integrally formed flange gear 54. As shown in FIGS. 3 and 4, the flange gear 54 of the outer shaft 26 is disposed axially adjacent the nut gear 46 of the inner shaft 24. The inner and outer shafts 24, 26 are rotatable relative to the housing 22 about a common rotational axis, and the inner shaft 24 is rotatable relative to the outer shaft 26. The nut gear 46 and the flange gear 54 may have substantially equal outer diameters, but the nut gear 46 may have fewer gear teeth than the flange gear 54. For example, the nut gear 46 may have fifty teeth and the flange gear 54 may have fifty-two teeth.

As shown in FIG. 3, the ring gear 28 may be fixedly attached to an axial end of the carrier 34 so that the ring gear 28 and carrier 34 are rotationally fixed to each other. A retaining ring 56 may retain the ring gear 28 on the carrier 34. The ring gear 28 and carrier 34 are rotatable relative to the housing 22, the inner shaft 24 and the outer shaft 26. The ring gear 28, carrier 34, the inner shaft 24 and the outer shaft 26 have a common rotational axis. The ring gear 28 may have a larger outer diameter than the nut gear 46 and the flange gear 54. For example, the ring gear 28 may have one-hundred teeth.

As shown in FIG. 3, the pinion gear 30 may be fixedly attached to a pinion shaft 58. The pinion shaft 58 may be rotatably supported by a bearing 60 that is fixed relative to the cap plate 38. The second motor 16 may be mounted to the cap plate 38 and may have an output shaft 59 that is drivingly connected to the pinion shaft 58 so that operation of the second motor 16 rotatably drives the pinion gear 30 relative to the housing 22. A rotational axis of the pinion gear 30 is parallel to and spaced apart from the rotational axis of the inner shaft 24, outer shaft 26, ring gear 28 and carrier 34. Teeth of the pinion gear 30 meshingly engage the teeth of the ring gear 28. In this manner, rotational of the pinion gear 30 causes corresponding rotation of the ring gear 28 and carrier 34. The pinion gear 30 has a smaller outer diameter than the ring gear 28 and has fewer teeth than the ring gear 28. For example, the pinion gear 30 may have twenty-nine teeth.

As shown in FIGS. 2 and 3, the carrier 34 may be a generally annular member having a central aperture 62 extending axially therethrough. The carrier 34 may extend circumferentially around the nut gear 46 and the flange gear 54 such that the nut gear 46 and flange gear 54 are disposed within the central aperture 62. The carrier 34 is supported for rotation relative to the housing 22 by a bearing 64. An annular retainer 66 may retain the bearing 64 on a hub 68 formed on the cap plate 38. The hub 68 also receives the bearing 48 that supports the inner shaft 24.

A shown in FIGS. 2 and 4, the carrier 34 may include a pair of side apertures 70 that extend radially through the carrier 34 and intersect with the central aperture 62. The planet gears 32 are rotatably mounted on shafts 72 that are attached to the carrier 34. The shafts 72 extend through respective side apertures 70 such that the planet gears 32 extend into the side apertures 70 to meshing engage the nut gear 46 and the flange gear 54.

Figure 5:
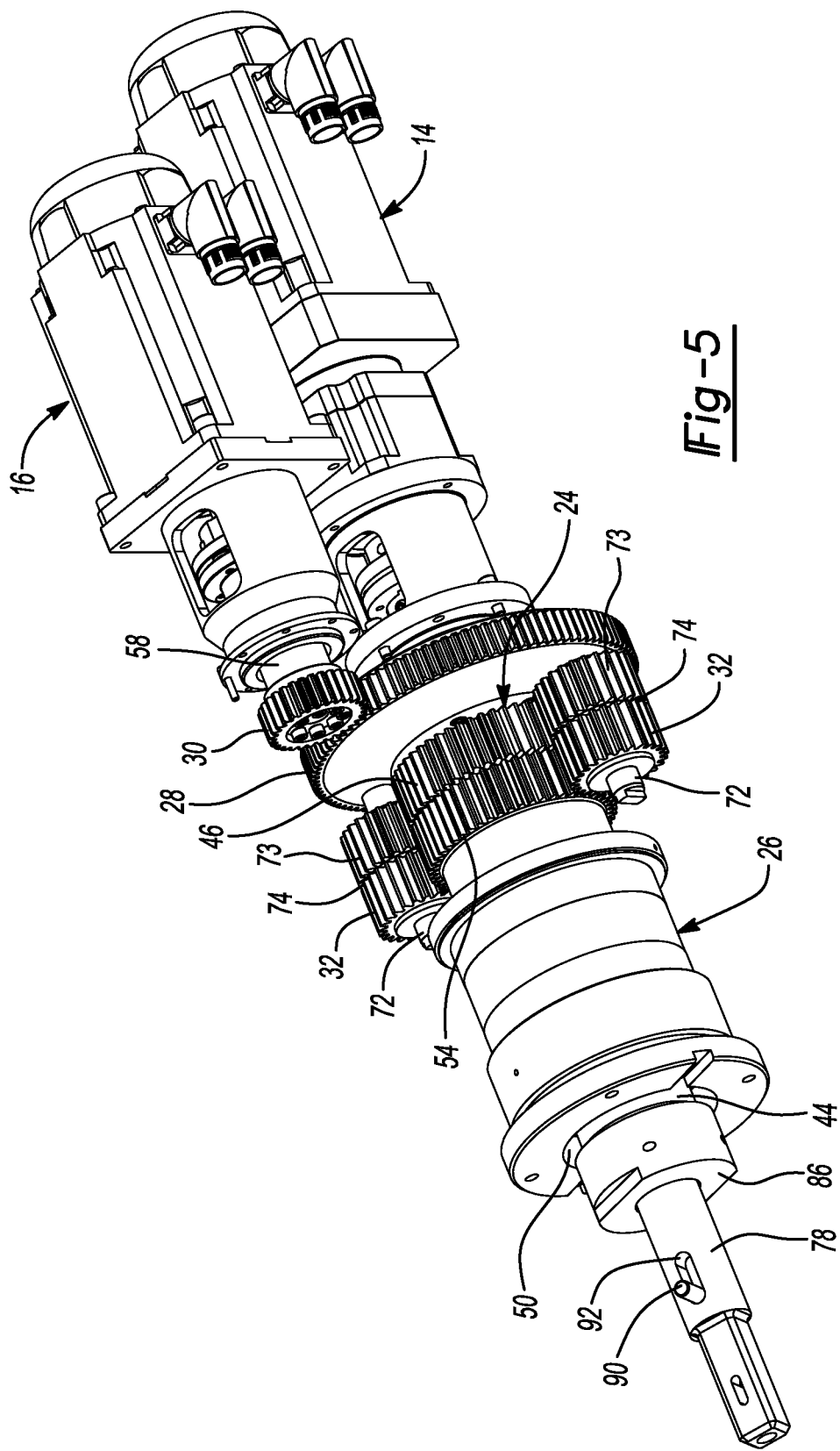
FIG. 5 is another partial perspective view of the bearing preload apparatus with a carrier and the portion of the gearbox housing removed.

As shown in FIGS. 2, 4, and 5, each planet gear 32 may have a set of gear teeth 73 and a relief or annular groove 74 that divide the teeth into first and second portions. In some configurations, however, the planet gears 32 do not have relief 74. The teeth 73 of each planet gear 32 meshingly engage the teeth of the nut gear 46 and the flange gear 54. The planet gears 32 have smaller outer diameters and fewer teeth than the nut gear 46 and flange gear 54. For example, each of the planet gears 32 may have twenty-five teeth 73. In some configurations, the first and second portions of the planet gears 32 may have different numbers of teeth.

Figure 6:
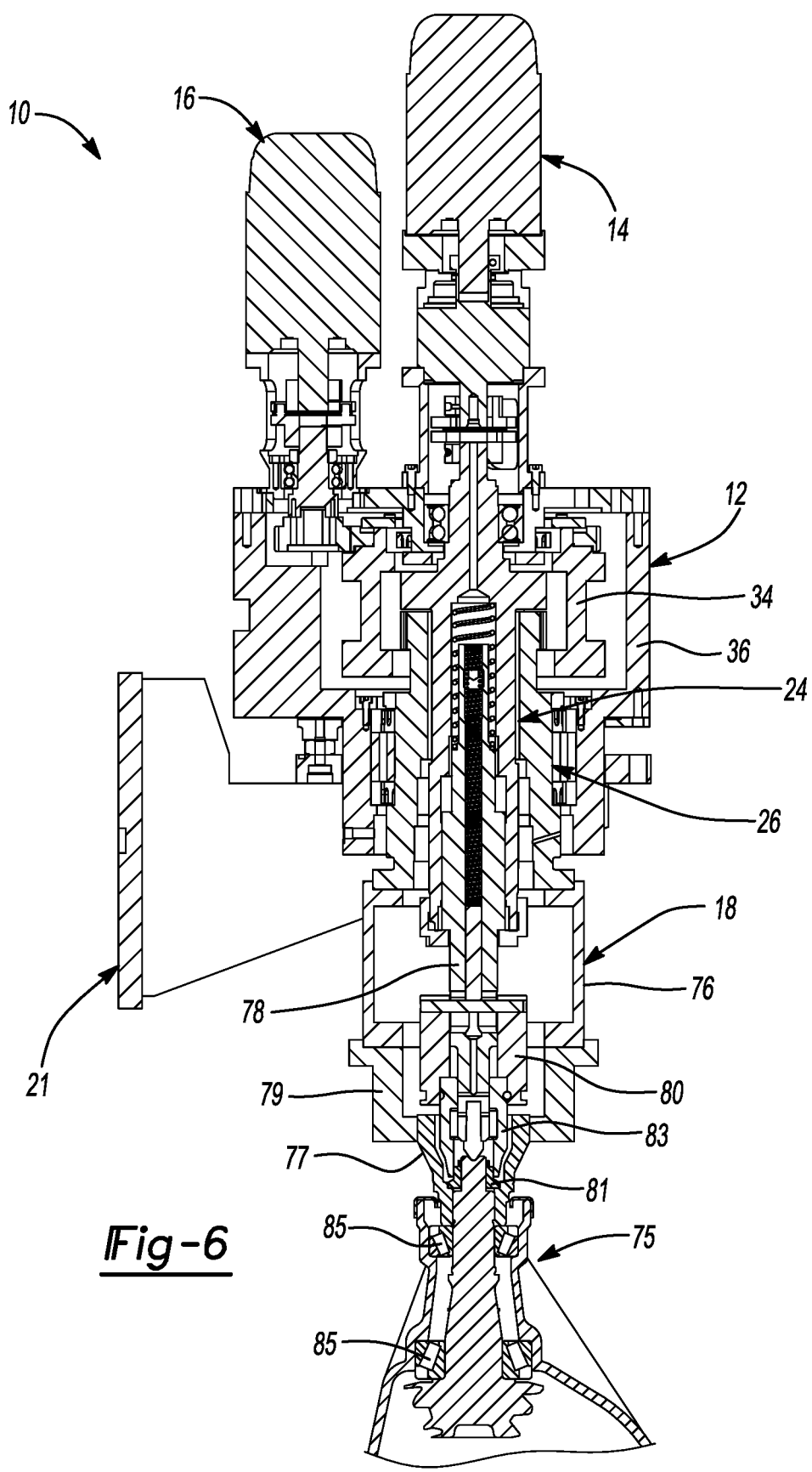
FIG. 6 is another cross-sectional view of the bearing preload apparatus engaging a pinion nut and pinion flange of an axle assembly.

The coupling assembly 18 may include an outer driver coupling 76 (FIGS. 1-3), a nut torque shaft 78 (FIGS. 2-5), and an inner driver coupling 80 (FIGS. 2 and 3). The coupling assembly 18 may transmit torque from the gearbox assembly 12 to a bearing to be preloaded. The outer driver coupling 76 may be an annular member defining a socket and may be mounted to the outer shaft 26 for rotation with the outer shaft 26. As shown in FIG. 6, the outer driver coupling 76 may be shaped and sized to engage a pinion flange 77 (e.g., via a first driver fitting 79) of an axle assembly 75.

As shown in FIG. 3, the nut torque shaft 78 may be partially received within a central aperture 82 in the inner shaft 24. The nut torque shaft 78 extends out of the central aperture 82 and protrudes axially from the second end 44 of the inner shaft 24. A spring 84 within the central aperture 82 may bias the nut torque shaft 78 in an axially downward direction relative to the inner shaft 24. An annular retainer 86 attached to the second end 44 of the inner shaft 24 retains the nut torque shaft 78 within the central aperture 82 and limits a range of axial movement of the nut torque shaft 78 relative to the inner shaft 24. Splines 88 (FIG. 2) formed on the nut torque shaft 78 are engaged with corresponding grooves in the central aperture 82 to rotationally fix the nut torque shaft 78 relative to the inner shaft 24 while still allowing the nut torque shaft 78 to move in an axial direction (i.e., along the rotational axis of the inner shaft 24) relative to the inner shaft 24.

The inner driver coupling 80 may be a generally cylindrical member including an axially extending aperture 89 that receives the nut torque shaft 78. As shown in FIG. 6, the inner driver coupling 80 can engage a pinion nut 81 of the axle assembly 75 (e.g., via a driver fitting 83) to tighten the pinion nut 81 relative to the pinion flange 77 during operation of the apparatus 10. The inner driver coupling 80 may be rotationally fixed to the nut torque shaft 78 by a pin 90 that extends through the nut torque shaft 78 and the inner driver coupling 80. As shown in FIGS. 4 and 5, the pin 90 may be received in a radially extending aperture 91 of the inner driver coupling 80 and in a slot 92 of the nut torque shaft 78. The slot 92 may be shaped and sized relative to the pin 90 to allow movement of the pin 90 and the inner driver coupling 80 relative to the nut torque shaft 78 in a direction along the rotational axis of the inner shaft 24.

As shown in FIG. 2, the torque sensor assembly 20 may include a base plate 94, an adaptor ring 96, and a plurality of sensors 98. The base plate 94 may include a central aperture 99 through which a portion of the housing 22 and the inner and outer shafts 24, 26 may extend. As shown in FIG. 1, the base plate 94 may be fixedly mounted to support arms 100 of the mounting bracket 21. As shown in FIG. 3, the adaptor ring 96 may be fixedly mounted to an underside of the main body 36 of the housing 22.

As shown in FIG. 3, the sensors 98 may be attached to and disposed between the base plate 94 and the adaptor ring 96 (i.e., the sensors 98 are sandwiched between the base plate 94 and the adaptor ring 96). The sensors 98 may be arranged in a circular pattern surrounding the central aperture 99 of the base plate 94. The sensors 98 can be any suitable torque-measuring or force-measuring devices, such as piezoelectric force transducers. For example, the sensors 98 could be Kistler Type 9027C three-component force sensors.

With continued reference to FIGS. 1-5, operation of the apparatus 10 will be described in detail. To apply a preload force to a bearing (not shown), a control module (e.g., processing circuitry) may operate the first and second motors 14, 16 simultaneously. As described above, operation of the first motor 14 drives rotation of the inner shaft 24 and the nut torque shaft 78 (which is rotationally fixed to the inner shaft 24). Operation of the second motor 16 drives rotation of the pinion gear 30. Rotation of the pinion gear 30 causes corresponding rotation of the ring gear 28 and the carrier 34 in the opposite direction as the pinion gear 30. As the ring gear 28 and carrier 34 rotate, the ring gear 28 torque is transferred via the planet gears 32 to the nut gear 46 of the inner shaft 24 and to the flange gear 54 of the outer shaft 26. Since the nut gear 46 has fewer teeth than the flange gear 54, the nut gear 46 (and thus the inner shaft 24 and inner driver coupling 80) will rotate faster than the flange gear 54, the outer shaft 26, and the outer driver coupling 76. This difference in rotational speed applies torque (e.g., between about one-hundred and one-hundred-thousand Newton-meters) to the pinion nut that develops a clamping force (i.e., the preload force) that is applied to the bearing.

The bearing preload force results in a resistance or drag torque for bearing rotation (e.g., about 10 Newton-meters or less). The gearbox assembly 12 isolates the high torque required to tighten the pinion nut 81, and the remaining torque required to rotate pinion bearings 85 of the axle assembly 75 (FIG. 6) is then reacted to ground through the sensors 98. The sensors 98 measure the reaction torque of the gearbox assembly 12 relative to the mounting bracket 21 and transmit that reaction torque data to the control module. The control module may continue to operate the first and second motors 14, 16 until the reaction torque of the gearbox assembly 12 reaches a predetermined value. The predetermined value can be selected to produce a desired amount of preload torque on the bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A bearing preload apparatus comprising:
    a gearbox assembly including a gearbox housing, a first shaft and a second shaft, the first and second shafts extend out of the gearbox housing and are rotatable simultaneously with each other at different speeds;
    a coupling assembly including a first driver coupling connected to the first shaft and a second driver coupling connected to the second shaft; and a sensor assembly mounted to a stationary structure and the gearbox housing, the sensor assembly measuring a reaction torque of the gearbox assembly relative to the stationary structure.

2. The bearing preload apparatus of claim 1, wherein the sensor assembly includes a plurality of sensors disposed between the gearbox housing and a plate attached to the stationary structure.

3. The bearing preload apparatus of claim 2, wherein the sensors are piezoelectric force transducers.

4. The bearing preload apparatus of claim 2, wherein the sensors are arranged in a circular pattern that extends around the first and second shafts.

5. The bearing preload apparatus of claim 1, wherein the first and second shafts have a common rotational axis.

6. The bearing preload apparatus of claim 5, wherein the first shaft extends through a central aperture of the second shaft.

7. The bearing preload apparatus of claim 6, wherein the first shaft includes a first gear, and wherein the second shaft includes a second gear that is axially adjacent the first gear.

8. The bearing preload apparatus of claim 7, wherein the gearbox assembly includes a pinion gear, a ring gear, and a plurality of planet gears.

9. The bearing preload apparatus of claim 8, further comprising a first motor and a second motor, wherein the first motor is drivingly connected to an end of the first shaft, and wherein the second motor is drivingly connected to a shaft extending from the pinion gear.

10. The bearing preload apparatus of claim 9, wherein the pinion gear is meshingly engaged with the ring gear, and wherein rotation of the ring gear causes the planet gears to orbit around the first and second shafts.

11. The bearing preload apparatus of claim 10, wherein each planet gear is meshingly engaged with the first and second gears.

12. The bearing preload apparatus of claim 11, wherein the second gear has more teeth than the first gear, and wherein the first and second gears have equal outer diameters.

13. A bearing preload apparatus comprising:
a first motor having a first output shaft;
a second motor having a second output shaft; and
a gearbox assembly driven by the first and second motors and including a gearbox housing, a plurality of planet gears, an inner shaft, and an outer shaft that extends around the inner shaft, the inner and outer shafts extend out of the gearbox housing and are rotatable simultaneously with each other at different speeds,
wherein the inner shaft includes a first gear, and the outer shaft includes a second gear,
wherein each of the planet gears is meshingly engaged with the first and second gears,
wherein the first output shaft of the first motor drives the inner shaft, and
wherein the second output shaft of the second motor drives orbital motion of the planet gears around the inner and outer shafts.

14. The bearing preload apparatus of claim 13, further comprising a coupling assembly including a first driver coupling connected to the inner shaft and a second driver coupling connected to the outer shaft.

15. The bearing preload apparatus of claim 13, further comprising a sensor assembly mounted to a stationary structure and the gearbox housing, the sensor assembly measuring a reaction torque of the gearbox assembly relative to the stationary structure to which the gearbox assembly is mounted.

16. The bearing preload apparatus of claim 15, wherein the sensor assembly includes a plurality of sensors disposed between the gearbox housing and a plate attached to the stationary structure.

17. The bearing preload apparatus of claim 16, wherein the sensors are arranged in a circular pattern that extends around the inner and outer shafts.

18. The bearing preload apparatus of claim 17, wherein the sensors are piezoelectric force transducers.

19. The bearing preload apparatus of claim 13, wherein the gearbox assembly includes a pinion gear and a ring gear.

20. The bearing preload apparatus of claim 19, wherein the second output shaft of the second motor is drivingly connected to a shaft extending from the pinion gear, and wherein the pinion gear is meshingly engaged with the ring gear, and wherein rotation of the ring gear causes the planet gears to orbit around the inner and outer shafts.

21. The bearing preload apparatus of claim 20, wherein the second gear has more teeth than the first gear, and wherein the first and second gears have equal outer diameters.

* * * * *